United States Patent
Guo et al.

(10) Patent No.: US 6,469,128 B1
(45) Date of Patent: Oct. 22, 2002

(54) PROCESS AND APPARATUS FOR PREPARING A POLY(ARYLENE ETHER)

(75) Inventors: Hua Guo, Selkirk, NY (US); Hugo Gerard Eduard Ingelbrecht, Essen (BE); David Parrillo, Schenectady; Probjot Singh, Delmar, both of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/682,210

(22) Filed: Aug. 7, 2001

(51) Int. Cl.[7] ............... C08G 65/38; C08G 65/44
(52) U.S. Cl. ............... 528/217; 528/212; 528/214; 528/502 R; 528/503; 425/74
(58) Field of Search ............... 528/217, 212, 528/214, 502 R, 503; 425/74

(56) References Cited

U.S. PATENT DOCUMENTS

| | | |
|---|---|---|
| 3,306,874 A | 2/1967 | Hay |
| 3,306,875 A | 2/1967 | Hay |
| 3,838,102 A | 9/1974 | Bennett et al. |
| 4,011,200 A | 3/1977 | Yonemitsu et al. |
| 4,463,164 A | 7/1984 | Dalton et al. |
| 4,556,699 A | 12/1985 | Bialy et al. |
| 4,906,700 A | 3/1990 | Banevicius |
| 2002/0010314 A1 | 1/2002 | Mitsui et al. |
| 2002/0013446 A1 | 1/2002 | Mitsui et al. |

FOREIGN PATENT DOCUMENTS

| | | | |
|---|---|---|---|
| EP | 1 167 419 A2 | * | 2/2002 |
| EP | 1 167 421 A2 | | 2/2002 |

OTHER PUBLICATIONS

U.S. patent application Ser. No. 09/681,985, filed on Jun. 21, 2001, Invented by Probjot Singh, Hugo Gerard Eduard Ingelbrecht, David Parrillo, and Mukund Parthasarathy.

D. M. White and S. A. Nye, Macromolecules (1990), vol. 23, issue 5, pp. 1318–1329.

K. P. Chan, D. S. Argyropoulos, D. M. White, G. W. Yeager, and A. S. Hay, Macromolecules (1994), vol. 27, No. 22, pp. 6371–5.

* cited by examiner

*Primary Examiner*—Duc Truong

(57) ABSTRACT

A process for producing a poly(arylene ether) resins includes oxidatively coupling a monohydric phenol in the presence of a solvent and a catalyst to form a soluble poly(arylene ether) and an insoluble poly(arylene ether), separating the soluble poly(arylene ether) and the insoluble poly(arylene ether), and recycling the soluble poly(arylene ether). The process is particularly useful for synthesizing poly(arylene ether) copolymers in which the monomer compositions of soluble and insoluble copolymers may vary.

35 Claims, 2 Drawing Sheets

PROCESS AND APPARATUS FOR PREPARING A POLY(ARYLENE ETHER)

BACKGROUND OF INVENTION

Poly(arylene ether) resins are well known and widely used thermoplastics valued for properties including heat resistance, stiffness, and high impact strength. The desire for thermoplastic compositions with increased heat resistance has fueled the discovery of poly(arylene ether) resins with molecular weights and/or monomer composition that enable improved heat resistance as manifested in properties including glass transition temperature, heat distortion temperature, and Vicat softening temperature.

Various methods of preparing poly(arylene ether) homopolymers and copolymers are known. U.S. Pat. No. 3,306,875 to Hay generally describes oxidation of phenols to polyphenylene ethers and diphenoquinones. U.S. Pat. No. 4,011,200 to Yonemitsu et al. generally describes copolymers comprising 50–98 mole percent of 2,6-dimethylphenol monomer units and 50–2 mole percent 2,3,6-trimethylphenol monomer units.

U.S. Pat. No. 4,463,164 to Dalton et al. generally describes a process for production of polyphenylene ethers, comprising oxidatively coupling monohydric phenols in the presence of a complex catalyst and in a liquid medium which is a solvent for the monomer and catalyst and a non-solvent for the polyphenylene ether, forming a slurry of particulate solids containing the polyphenylene ether precipitate, and washing the slurry with an aqueous solution of a chelating agent to remove catalyst residue. The process may utilize solvent recycling.

U.S. Pat. No. 4,556,699 to Bialy et al. generally describes a process for the production of polyphenylene ethers by means of the oxidative polymerization of 2,6-xylenol, with either oxygen or a gas containing molecular oxygen, in the presence of a catalyst, by continuously operating in a circulation system, and with the precipitation of the polymer in the liquid reaction medium. The precipitated polymer is continuously recovered, and part of it may be recycled to the polymerization reactor.

U.S. Pat. No. 4,906,700 to Banevicius generally describes a process for reduction of odoriferous poly(arylene ether) by-products, such as 2,3,6-trimethylanisole, by continuously distilling and recycling the aromatic hydrocarbon solvent used in the poly(arylene ether) polymerization.

There remains a need for a poly(arylene ether) production process that more efficiently utilizes raw materials to form poly(arylene ether) resins that are insoluble in the polymerization reaction mixture. There further remains a need for a poly(arylene ether) production process that efficiently utilizes soluble poly(arylene ether) resins that may be formed in the presence of the desired insoluble poly(arylene ether) resins.

SUMMARY OF INVENTION

The above-described and other drawbacks and disadvantages of the prior art are alleviated by a process for producing a poly(arylene ether), comprising: oxidatively coupling a monohydric phenol in a reactor using an oxygen-containing gas in the presence of a solvent and a complex metal catalyst to produce a soluble poly(arylene ether) resin and an insoluble poly(arylene ether) resin; separating the soluble poly(arylene ether) resin and the insoluble poly(arylene ether) resin; and recycling a portion of the soluble poly(arylene ether) resin to the reactor.

Other embodiments, including an apparatus for forming a poly(arylene ether) resin, are described below.

DETAILED DESCRIPTION

Figure 1:
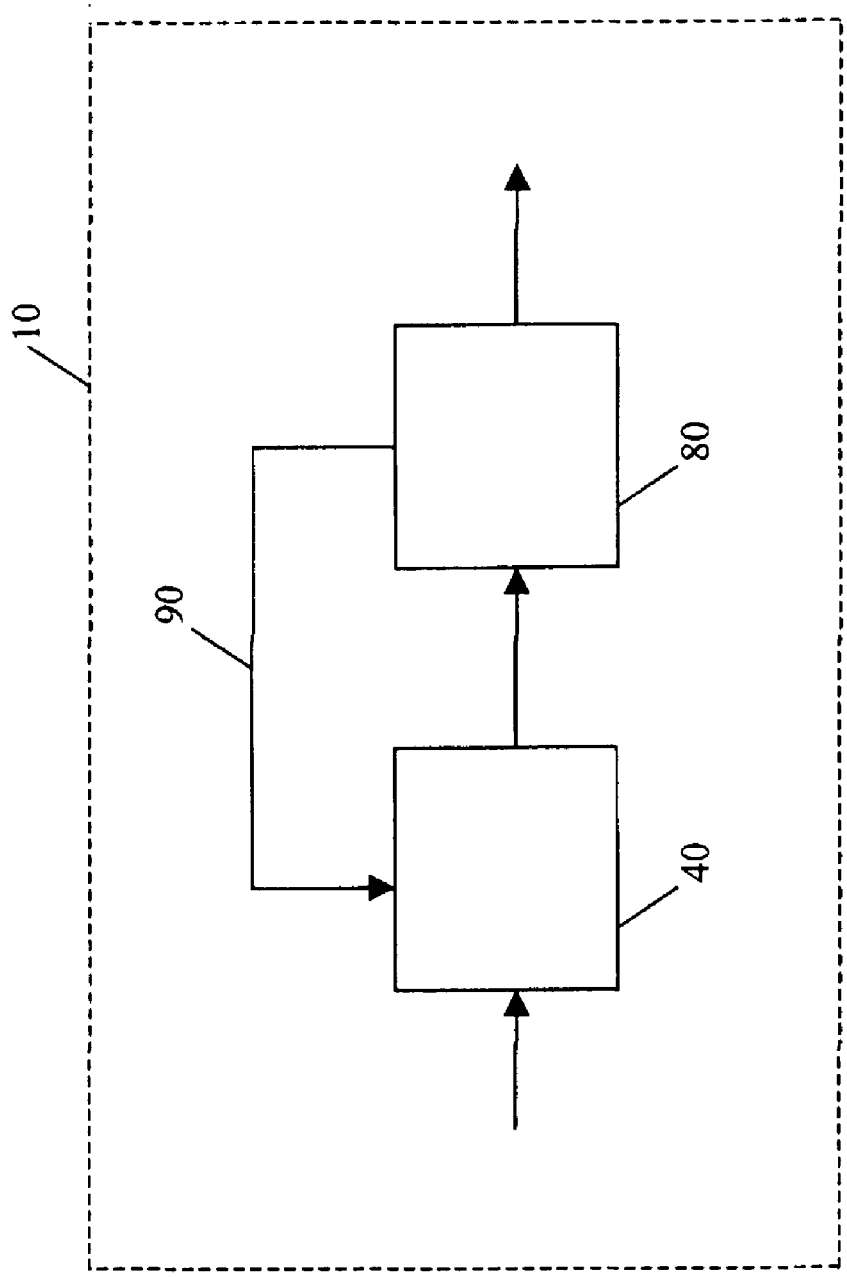
FIG. 1 is a simplified diagrammatic view of an apparatus for forming a poly(arylene ether) resin.

One embodiment is a process for producing a poly (arylene ether), comprising: oxidatively coupling a monohydric phenol in a reactor using an oxygen-containing gas in the presence of a solvent and a complex metal catalyst to produce a soluble poly(arylene ether) resin and an insoluble poly(arylene ether) resin; separating the soluble poly (arylene ether) resin and the insoluble poly(arylene ether) resin; and recycling a portion of the soluble poly(arylene ether) resin to the reactor.

The present inventors have found that in a process to produce a poly(arylene ether) resin that is insoluble in the polymerization reaction mixture, the efficiency and productivity of the process may be improved by separating and recycling any soluble poly(arylene ether) resin present in the polymerization reaction mixture. While the method is applicable to poly(arylene ether) homopolymers and copolymers, it is particularly useful for poly(arylene ether) copolymer synthesis in which the monomer compositions of the monomer feed, the soluble poly(arylene ether), and the insoluble poly(arylene ether) may differ from each other.

There is no particular limitation on the monohydric phenol used in the poly(arylene ether) synthesis. Suitable monohydric phenols include those having the formula:

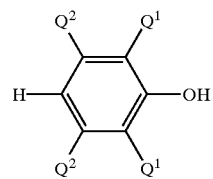

wherein each $Q^1$ is independently halogen, $C_1$–$C_7$ primary or secondary alkyl, phenyl, $C_1$–$C_7$ haloalkyl, $C_1$–$C_7$ aminoalkyl, $C^1$–$C_7$ hydrocarbonoxy, $C_2$–$C_7$ halohydrocarbonoxy wherein at least two carbon atoms separate the halogen and oxygen atoms, or the like; and each $Q^2$ is independently hydrogen, halogen, $C_1$–$C_7$ primary or secondary alkyl, phenyl, $C_1$–$C_7$ haloalkyl, $C_1$–$C_7$ hydrocarbonoxy, $C_2$–$C_7$ halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen or methyl.

In a preferred embodiment, the poly(arylene ether) is a copolymer of a first monohydric phenol and a second monohydric phenol, wherein the first monohydric phenol and the second monohydric phenol are different from each other and each has the formula:

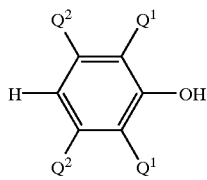

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

In a highly preferred embodiment, the poly(arylene ether) is a copolymer of 2,6-dimethylphenol (hereinafter "DMP") and 2,3,6-trimethylphenol (hereinafter "TMP"). In this embodiment, the copolymer may comprise 2,6-dimethyl-1,4-phenylene ether units (derived from DMP) and 2,3,6-trimethyl-1,4-phenylene ether units (derived from TMP) in any proportion, from weight ratios of 1:99 to 99:1. It may be preferred that the weight ratio of 2,6-dimethyl-1,4-phenylene ether units to 2,3,6-trimethyl-1,4-phenylene ether units is at least about 1:10, more preferably at least about 1:5, yet more preferably at least about 2:5, in order to improve compatibility with procedures and apparatuses useful for the production of poly(2,6-dimethyl-1,4-phenylene ether) homopolymer. It may also be preferred that the weight ratio of 2,6-dimethyl-1,4-phenylene ether units to 2,3,6-trimethyl-1,4-phenylene ether units is up to about 10:1, more preferably up to about 5:1, yet more preferably up to about 5:2, so that the heat resistance of the copolymer is sufficient.

The oxidative coupling of the monohydric phenol uses an oxygen-containing gas, which is typically oxygen ($O_2$) or air, with oxygen being preferred.

The monohydric phenol is oxidatively coupled in the presence of a solvent and a complex metal catalyst. Suitable organic solvents include aliphatic alcohols, ketones, aliphatic and aromatic hydrocarbons, chlorohydrocarbons, nitrohydrocarbons, ethers, esters, amides, mixed ether-esters, sulfoxides, and the like, and combinations comprising at least one of the foregoing organic solvents, providing they do not interfere with or enter into the oxidation reaction. In a preferred embodiment, the solvent comprises a $C_6$–$C_{18}$ aromatic hydrocarbon, including, for example, toluene, xylenes, and the like, and mixtures thereof. A highly preferred solvent is toluene.

The solvent may comprise, in addition to a $C_6$–$C_{18}$ aromatic hydrocarbon, a $C_3$–$C_8$ aliphatic alcohol that is a poor solvent for the soluble and insoluble poly(arylene ether) resins, such as, for example, n-propanol, isopropanol, n-butanol, t-butanol, n-pentanol, and the like, and combinations comprising at least one of the foregoing $C_3$–$C_8$ aliphatic alcohols. A preferred $C_3$–$C_8$ aliphatic alcohol is n-butanol. The solvent may further comprise, in addition to a $C_6$–$C_{18}$ aromatic hydrocarbon and a $C_3$–$C_8$ aliphatic alcohol, methanol or ethanol, which act as an anti-solvent for the soluble and insoluble poly(arylene ether) resins. The $C_6$–$C_{18}$ aromatic hydrocarbon, the $C_3$–$C_8$ aliphatic alcohol, and the methanol or ethanol may be combined in any proportion, but it may be preferred that the solvent comprise at least about 50 weight percent of the $C_6$–$C_{18}$ aromatic hydrocarbon.

The complex metal catalyst may comprise a metal ion. Preferred metal ions include ions from Group VIB, VIIB, or IB of the periodic table, and combinations thereof. Of these, ions of chromium, manganese, cobalt, copper, and combinations comprising at least one of the foregoing ions may be preferred, with copper ions ($Cu^+$ and $Cu^{2+}$) being highly preferred.

The complex metal catalyst may further comprise a nitrogen-containing ligand. The nitrogen-containing ligand may include, for example, alkylenediamine ligands, primary monoamines, secondary monoamines, tertiary monoamines, aminoalcohols, oxines, combinations comprising at least one of the foregoing nitrogen-containing ligands, or the like.

Suitable alkylenediamine ligands include those having the formula

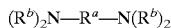

wherein $R^a$ is a substituted or unsubstituted divalent residue wherein two or three aliphatic carbon atoms form the closest link between the two diamine nitrogen atoms; and each $R^b$ is independently hydrogen or $C_1$–$C_8$ alkyl. Preferred alkylenediamine ligands include those in which $R^a$ is ethylene (—$CH_2CH_2$—) or trimethylene (—$CH_2CH_2CH_2$—), and each $R^b$ is independently hydrogen, isopropyl, or a $C_4$–$C_8$ alpha-tertiary alkyl group. Highly preferred alkylenediamine ligands include N,N'-di-t-butylethylenediamine and N,N,N',N'-tetramethyl-1,3-diaminopropane.

Suitable primary monoamines include $C_3$–$C_{12}$ primary alkylamines, such as, for example, n-propylamine, i-propylamine, n-butylamine, sec-butylamine, t-butylamine, n-pentylamine, n-hexylamine, cyclohexylamine, combinations comprising at least one of the foregoing primary monoamines, and the like. A highly preferred primary monoamine is n-butylamine.

Suitable secondary monoamines include secondary monoamines having the structure $(R^c)(R^d)NH$, wherein $R^c$ and $R^d$ are each independently a $C_1$–$C_{11}$ alkyl group, with the proviso that $R^c$ and $R^d$ collectively have a total of four to twelve carbon atoms. Examples of secondary monoamines include di-n-propylamine, n-propyl-n-butylamine, di-n-butylamine, d-t-butylamine, n-butyl-n-pentylamine, di-n-hexylamine, and the like, with di-n-butylamine being preferred.

Suitable tertiary monoamines include tertiary monoamines having the structure $(R^e)(R^f)(R^g)N$, wherein $R^e$ and $R^f$ and $R^g$ are each independently a $C_1$–$C_{16}$ alkyl group, with the proviso that $R^e$ and $R^f$ and $R^g$ collectively have a total of four to eighteen carbon atoms. Examples of tertiary monoamines include triethylamine, tri-n-propylamine, tri-n-butylamine, dimethyl-n-butylamine, dimethyl-n-pentylamine, diethyl-n-butylamine, triycyclohexylamine, and the like. In addition, cyclic tertiary amines, such as pyridine, alpha-collidine, gamma-picoline, and the like, can be used. Highly preferred tertiary monoamines include dimethyl-n-butylamine. Additional primary, secondary, and tertiary amines are described in U.S. Pat. Nos. 3,306,874 and 3,306,875 to Hay.

Suitable aminoalcohols include $C_4$–$C_{12}$ aminoalcohols having one nitrogen atom and an alcohol oxygen, wherein at least two carbon atoms separate the amino nitrogen and the alcohol oxygen. Examples of aminoalcohols include N,N-diethylethanolamine, 4-butanolamine, N-methyl-4-butanolamine, diethanolamine, triethanolamine, N-phenyl-ethanolamine, and the like, and combinations comprising at least one of the foregoing aminoalcohols. Highly preferred aminoalcohols include triethanolamine and N-phenyl-ethanolamine.

Suitable oxines include those having the formula:

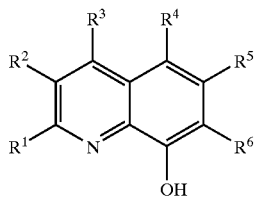

wherein $R^1$–$R^6$ are each independently hydrogen, halogen, hydroxyl, nitro, amino, $C_1$–$C_6$ alkyl, or $C_1$–$C_6$ alkoxyl. Examples of oxines include oxine, 5-methyloxine, 5-hydroxyoxine, 5-nitroxine, 5-aminoxine, 2-methyloxine, and the like, and combinations comprising at least one of the foregoing oxines. Highly preferred oxines include oxine and 5-methyloxine.

The alkylenediamine ligands, primary monoamines, secondary monoamines, aminoalcohols, and oxines, when present, may be used at about 0.01 to about 25 moles per 100 moles of monohydric phenol. The tertiary monoamines may be used at about 0.1 to about 1,500 moles per 100 moles of monohydric phenol. Selections of appropriate concentrations within these ranges may be made by those of ordinary skill in the art without undue experimentation, and selected concentrations may reflect the presence of other reaction components or products, such as water, that may affect catalyst efficiency. A suitable molar ratio of complex metal catalyst (measured as moles of metal) to phenol is about 1:50 to about 1:400, with about 1:100 to about 1:200 being preferred.

The complex metal catalyst may, optionally, further include a halide ion such as chloride, bromide, or iodide. When employed, halide ions may be supplied to the reaction mixture in the form of an alkali metal salt or an alkaline earth metal salt at a concentration of about 0.1 mole to about 150 moles per 100 moles of phenolic monomer.

In a preferred embodiment, the complex metal catalyst comprises copper ion, a secondary alkylenediamine ligand, a secondary monoamine, and a tertiary monoamine. In a highly preferred embodiment, the complex metal catalyst comprises copper ion, N,N'-di-t-butylethylenediamine, di-n-butylamine, and dimethyl-n-butylamine.

The process and reaction conditions for the polymerization, such as reaction time, temperature, oxygen flow rate, and the like may be modified based on the target molecular weight and monomer composition of the insoluble poly(arylene ether). The endpoint of the polymerization may conveniently be determined by making molecular weight measurements, running to a predetermined reaction time, controlling to a specified end group concentration, or the oxygen concentration in solution may also be utilized.

The temperature to carry out the polymerization stage is generally about 0° C. to about 95° C. Within this range, it may be preferred to use a temperature of at least about 35° C. Also within this range, it may be preferred to use a temperature up to 45° C. At temperatures substantially higher than about 95° C., side reactions can occur leading to reaction by-products, and at temperatures substantially lower than about 0° C., ice crystals may form in the solution.

The method may, optionally, further comprise recovering the complex metal catalyst with an aqueous solution. Many diverse extractants or chelating agents may be used to complex with the catalyst after the end of the polymerization reaction. For example, sulfuric acid, acetic acid, ammonium salts, bisulfate salts and various chelating agents may be used. When these materials are added to a poly(arylene ether) reaction solution, the complex metal catalyst becomes poisoned and further oxidation does not take place. Many different materials may be used but it is preferred to employ those chelating agents that are disclosed in U.S. Pat. No. 3,838,102 to Bennett et al. Useful chelating agents include polyfunctional carboxylic acid containing compounds, such as, for example, polyalkylenepolyamine polycarboxylic acids, aminopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts. Specific examples of chelating agents include, for example, sodium potassium tartrate, nitrilotriacetic acid (NTA), citric acid, glycine, ethylenediaminetetraacetic acid (EDTA), hydroxyethylenediaminetriacetic acid, diethylenetriaminepentaacetic acid, salts of the foregoing chelating agents, combinations comprising at least one of the foregoing chelating agents, and the like. Especially preferred chelating agents include ethylenediaminetetraacetic acid or a mono-, di-, tri- and tetrasodium salt thereof. The resulting copper complex can be referred to as a copper carboxylate complex.

The complex metal catalyst component dissolved in the water phase may, optionally, be separated from the insoluble poly(arylene ether) and the soluble poly(arylene ether)/toluene solution. For example, an aqueous solution of a chelating agent may be added with stirring to the reactor effluent (including soluble polymer, insoluble polymer, solvent, and metal complex catalyst) to form a mixture that may be held for about two hours before the aqueous phase is decanted from the bottom of the tank. The aqueous solution may comprise a lower alkanol, for example, a mixture of water and an alkanol having from 1 to about 4 carbon atoms. Generally from about 1% to about 80% by volume of the alkanol may be employed, based on the total volume of the aqueous solution of lower alkanol. The volume ratio of the aqueous liquid extractant to discrete organic phase may vary from about 0.01:1 to about 10:1.

The reaction medium may comprise an aqueous environment. Anti-solvents can also be utilized in combination with the aqueous media to help drive the precipitation of the copper (I) species. The selection of an appropriate anti-solvent is based partially on the solubility coefficient of the copper (I) species that is being precipitated. The halides are highly insoluble in water, $\log(K_{sp})$ values at 25° C. are −4.49, −8.23, and −11.96 for CuCl, CuBr, and CuI, respectively. Solubility in water is increased by the presence of excess of halide ions due to the formation of, e.g., $CuCl_2^-$, $CuCl_3^{2-}$, and $CuCl_4^{3-}$, and by other complexing species. Examples of anti-solvents include low molecular weight aliphatic and aromatic hydrocarbons, ketones, alcohols, and the like, which have some solubility in the aqueous solution. One skilled in the art would be able to select an appropriate type and amount of anti-solvent, if any was utilized.

The polymerization reaction produces a soluble poly(arylene ether) and an insoluble poly(arylene ether), and the process comprises separating the soluble poly(arylene ether) resin and the insoluble poly(arylene ether) resin. Both soluble and insoluble poly(arylene ether) resins may be formed because the polymerization reaction produces poly(arylene ether) resins having a wide distribution of molecular weights and monomer compositions. Separating the soluble poly(arylene ether) resin and the insoluble poly(arylene ether) resin may be performed by any method capable of effecting a physical separation into a first fraction comprising at least about 80 of the soluble poly(arylene ether) produced in the reaction and no more than about 20 of the insoluble poly(arylene ether), and a second fraction comprising at least about 80 of the insoluble poly(arylene ether) produced in the reaction and no more than about 20 of the soluble poly(arylene ether). It may be preferred that the first fraction comprise less than about 10 weight percent, preferably less than about 5 weight percent, preferably less than about 1 weight percent, of insoluble poly(arylene ether), based on the total weight of the first fraction. It may also be preferred that the second fraction comprise less than about 20 weight percent, preferably less than about 10 weight percent, preferably less than about 5 weight percent, of soluble poly(arylene ether), based on the total weight of the second fraction. Suitable separation methods include, for example, solid-liquid centrifugation, basket centrifugation, rotating filtration, continuous rotary vacuum filtration, continuous moving bed filtration, batch filtration, and the like, and combinations comprising at least one of the foregoing methods. Presently preferred separation methods include, for example, solid-liquid centrifugation, basket centrifugation, and the like, and combinations comprising at least one of the foregoing methods.

In a preferred embodiment, the insoluble poly(arylene ether) resin may have an intrinsic viscosity of at least about 0.2 dL/g, more preferably at least about 0.3 dL/g, yet more preferably at least about 0.4 dL/g, as measured in a 74:15 weight/weight mixture of chloroform and chlorobenzene at 25° C. A detailed procedure for measuring an intrinsic viscosity in the chloroform/chlorobenzene solvent system is provided below in Example 2. The present inventors have found that this chloroform/chlorobenzene procedure is suitable for a wider range of poly(arylene ether) compositions and molecular weights than is the more common procedure utilizing chloroform alone. Although there is no particular upper limit on the intrinsic viscosity of the insoluble poly (arylene ether), it is typically less than about 1.5 dL/g, more typically less than about 1.0 dL/g.

In a preferred embodiment, the soluble poly(arylene ether) resin may have an intrinsic viscosity less than about 0.6 dL/g, more preferably less than about 0.4 dL/g, yet more preferably less than about 0.3 dL/g as measured in a 74:15 weight/weight mixture of chloroform and chlorobenzene at 25° C. Although there is no particular lower limit on the intrinsic viscosity of the soluble poly(arylene ether), it is typically at least about 0.05 dL/g, more typically at least about 0.1 dL/g as measured in a 74:15 weight/weight mixture of chloroform and chlorobenzene at 25° C. The soluble poly(arylene ether) shall be understood to include polymerization products including at least three phenylene ether units; conversely, the soluble poly(arylene ether) shall be understood to exclude monomers (i.e., monohydric phenols) and dimers.

In another preferred embodiment, the insoluble poly (arylene ether) may comprise at least about 20 weight percent, preferably at least about 30 weight percent, more preferably at least about 40 weight percent, yet more preferably at least about 50 weight percent, of 2,3,6-trimethyl-1,4-phenylene ether units, based on the total weight of the insoluble poly(arylene ether).

The present inventors have surprisingly found that the soluble poly(arylene ether) resin and the insoluble poly (arylene ether) resin may have different monomer compositions. For example, in the synthesis of poly(arylene ether) copolymers from 2,6-dimethylphenol and 2,3,6-trimethylphenol, the mole fraction of 2,3,6-trimethyl-1,4-phenylene ether units in the soluble poly(arylene ether) resin may be less than the mole fraction of 2,3,6-trimethyl-1,4-phenylene ether units in the insoluble poly(arylene ether) resin. These differences in mole fraction of 2,3,6-trimethyl-1,4-phenylene ether units may be at least about 0.05 and are commonly at least about 0.1.

The process further comprises recycling a portion of the soluble poly(arylene ether) resin to the reactor. The recycling step is particularly useful to increase the efficiency of the process because recovering the soluble poly(arylene ether) resin by precipitation with an anti-solvent produces undesirably high levels of so-called fines (solid poly(arylene ether) resin particles having a particle size less than about 38 micrometers). So, the soluble poly(arylene ether) resin is efficiently used by recycling it to the reactor for further polymerization leading to its precipitation in the reactor.

Recycling a portion of the soluble poly(arylene ether) may comprise, for example, returning at least about 20 weight percent, preferably at least about 50 weight percent, more preferably at least about 80 weight percent, yet more preferably at least about 90 weight percent, of the soluble poly(arylene ether) to the reactor. For example, all or a part of the first fraction described above may be returned to the reactor.

In one embodiment, the monomer composition of the monomer feed (i.e., the monohydric phenol), the recycled soluble poly(arylene ether), and the insoluble poly(arylene ether) may differ substantially from each other. For example, in the synthesis of poly(arylene ether) copolymers from 2,6-dimethylphenol and 2,3,6-trimethylphenol, the molar ratio of 2,3,6-trimethylphenol to 2,6-dimethylphenol in the monomer feed may be greater (e.g., at least about 0.05 greater) than the molar ratio of 2,3,6-trimethyl-1,4-phenylene ether units to 2,6-dimethyl-1,4-phenylene ether units in the insoluble poly(arylene ether), which in turn may be greater.(e.g., at least about 0.05 greater) than the molar ratio of 2,3,6-trimethyl-1,4-phenylene ether units to 2,6-dimethyl-1,4-phenylene ether units in the soluble poly (arylene ether).

In a preferred embodiment, the polymerization reaction mixture comprising a solvent, a soluble poly(arylene ether), and an insoluble poly(arylene ether) is treated to remove the complex metal catalyst (according to methods described below) and separated into a first fraction comprising the solvent and the soluble poly(arylene ether) and a second fraction comprising the insoluble poly(arylene ether). The first fraction is then recycled to the reactor. Thus, in this embodiment, recycling a portion of the soluble poly(arylene ether) resin comprises recycling a portion of the solvent to the reactor. It may be preferred to recycle at least about 25 weight percent, more preferably at least about 50 weight percent, yet more preferably at least about 75 weight percent, of the solvent to the reactor, wherein the weight percentages are based on the total solvent employed in the polymerization reaction.

The process is suitable for use as, for example, a batch process, a semi-batch process, a continuous process, or the like, or combinations of the foregoing process types.

In a preferred embodiment, the process for producing a poly(arylene ether) copolymer, comprises: oxidatively coupling a first monohydric phenol and a second monohydric phenol in a reactor using an oxygen-containing gas in the presence of a solvent and a complex metal catalyst to produce a soluble poly(arylene ether) copolymer and an insoluble poly(arylene ether) copolymer; wherein the first monohydric phenol and the second monohydric phenol are different from each other and each has the formula:

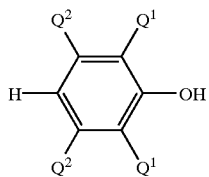

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms; separating the soluble poly(arylene ether) copolymer and the insoluble poly(arylene ether) copolymer; and recycling a portion of the soluble poly(arylene ether) copolymer to the reactor.

In a highly preferred embodiment, the process for producing a poly(arylene ether) copolymer, comprises: oxidatively coupling 2,6-dimethylphenol and 2,3,6-trimethylphenol in a reactor using an oxygen-containing gas in the presence of a solvent and a complex metal catalyst to produce a soluble poly(arylene ether) copolymer and an insoluble poly(arylene ether) copolymer; separating the soluble poly(arylene ether) copolymer and the insoluble poly(arylene ether) copolymer; and recycling a portion of the soluble poly(arylene ether) copolymer to the reactor. In this embodiment, recycling a portion of the soluble poly(arylene ether) may optionally comprise maintaining the soluble poly(arylene ether) at a temperature T according to the expression $$T > \left( \frac{\phi_s - (0.296 \times IV + 1.27 \times TMP - 35.7)}{1.97(1 - 0.00795 \times IV - 0.0249 \times TMP)} \right)$$

where $\phi_S$ is the soluble poly(arylene ether) concentration in toluene, expressed in weight percent; IV is the intrinsic viscosity of the soluble poly(arylene ether) copolymer in a 74:15 weight/weight mixture of chloroform and chlorobenzene at 25° C., expressed in mL/g; and TMP is the content of 2,3,6-trimethyl-1,4-phenylene ether units in the soluble poly(arylene ether) copolymer, expressed in weight %, based on the total weight of the soluble poly(arylene ether) copolymer. Maintaining this temperature, T, reduces any precipitation of the soluble poly(arylene ether) during recycling. Also in this embodiment, the concentration of the soluble poly(arylene ether) in the recycled portion may be given by $\phi_S$ according to the expression $$\phi_S \leq (0.30) IV + (1.27) TMP - (35.7) + (1.97) T (1 - (0.0080) IV - (0.0249)^* TMP)$$

where $\phi_S$ is expressed in weight percent, IV is the soluble poly(arylene ether) copolymer intrinsic viscosity in a 74:15 weight/weight mixture of chloroform and chlorobenzene at 25° C. (expressed in mL/g), TMP is weight percent of 2,3,6-trimethyl-1,4-phenylene ether units in the soluble poly(arylene ether) copolymer (expressed in weight percent), and T is the temperature of the recycled portion (expressed in °C.). The expressions above for the T and $\phi_S$ are based on experiments to determine the solubility of poly(arylene ether) copolymers in toluene as a function of their monomer composition, intrinsic viscosity, and temperature. These experiments are described in detail in U.S. application Ser. No. 09/681,895, filed Jun. 21, 2001.

One embodiment is an apparatus for producing a poly (arylene ether), comprising: means for oxidatively coupling a monohydric phenol using an oxygen-containing gas in the presence of a solvent and a complex metal catalyst to produce a soluble poly(arylene ether) resin and an insoluble poly(arylene ether) resin; means for separating the soluble poly(arylene ether) resin and the insoluble poly(arylene ether) resin; and means for recycling a portion of the soluble poly(arylene ether) resin to the reactor.

Another embodiment, illustrated in the simplified diagram of FIG. 1, is a poly(arylene ether) plant 10, comprising: a reactor 40 for oxidatively coupling a monohydric phenol using an oxygen-containing gas in the presence of a solvent and a complex metal catalyst to produce a soluble poly (arylene ether) resin and an insoluble poly(arylene ether) resin; a solid-liquid separator 80 for separating the soluble poly(arylene ether) resin and the insoluble poly(arylene ether) resin; and a soluble poly(arylene ether) recycling line 90 for recycling a portion of the soluble poly(arylene ether) resin from the solid-liquid separator to the reactor.

Figure 2:
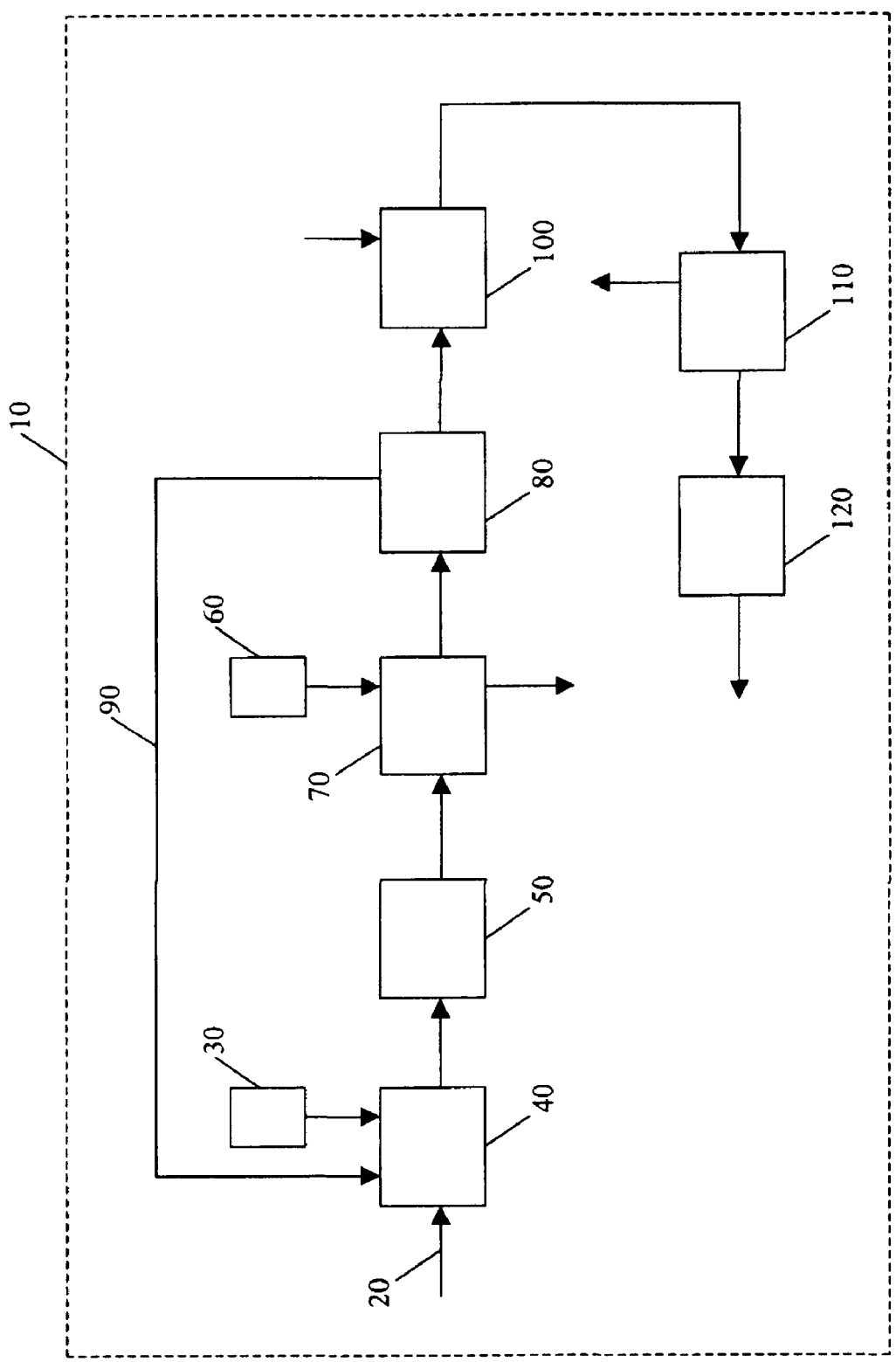
FIG. 2 is a simplified diagrammatic view of a preferred apparatus for forming a poly(arylene ether) resin.

Still another embodiment, illustrated in the simplified diagram of FIG. 2, is a poly(arylene ether) plant 10, comprising: a reactor 40 for oxidatively coupling a monohydric phenol using an oxygen-containing gas in the presence of a solvent and a complex metal catalyst to produce a soluble poly(arylene ether) resin and an insoluble poly(arylene ether) resin; a catalyst recovery tank 70 for separating the complex metal catalyst from the soluble poly(arylene ether) resin and the insoluble poly(arylene ether) resin; a first solid-liquid separator 80 for separating the soluble poly (arylene ether) resin and the insoluble poly( arylene ether) resin; a soluble poly(arylene ether) recycling line 90 for recycling a portion of the soluble poly(arylene ether) resin from the first solid-liquid separator to the reactor; a reslurry tank 100 to disperse the insoluble poly(arylene ether) resin in an anti-solvent; a second solid-liquid separator 110 for separating the insoluble poly(arylene ether) resin from the anti-solvent; and a dryer 120 for drying the insoluble poly (arylene ether) resin. The poly(arylene ether) plant 10 may, optionally, further comprise a monomer feed line 20 to deliver monohydric phenol to the reactor 40, a catalyst tank 30 serving as a reservoir for the complex metal catalyst to be added to the reactor 40, a dilution tank 50 to equilibrate the soluble poly(arylene ether) resin with any diphenoquinone present, and a chelating agent tank 60 serving as a reservoir for chelating agent used in metal complex catalyst recovery.

The invention is further illustrated by the following non-limiting examples.

EXAMPLE 1

This example illustrates the synthesis and isolation of a poly(arylene ether) copolymer having 50 weight percent of repeating units derived from 2,3,6-trimethylphenol and 50 weight percent of units derived from 2,6-dimethylphenol. In a reactor were combined cuprous oxide ($Cu_2O$; 0.014 kg, obtained from American Chemet as purple copper) dissolved in hydrobromic acid (0.222 kg as 48% aqueous solution, CAS Reg. No.10035-10-6, obtained from Great Lakes), N,N'-di-t-butylethylenediamine (0.062 kg, DBEDA, CAS Reg. No. 4062-60-6 obtained from Celanese), di-n-butylamine (0.212 kg, DBA, CAS Reg. No. 111-92-2, obtained from Celanese), N,N-dimethylbutylamine (1.449 kg, DMBA, CAS Reg. No. 927-62-8, obtained from Celanese), a tetraalkylammonium chloride surfactant (0.034 kg, CAS Reg. No. 5137-55-3, obtained from Cognis as Aliquat), 2,6-dimethylphenol (1.77 kg) and toluene solvent (144.93 kg). Over the course of the polymerization reaction, additional 2,6-dimethylphenol (10.03 kg) was added, along with 2,3,6-trimethylphenol (11.8 kg). During the polymerization, the nitrogen flow rate was 61.3 liters/minute, the oxygen flow rate was 27.15 liters/minute, and the temperature increased gradually from 29.4° C. to 55.0° C. After the completion of the polymerization reaction, a two-phase mixture (solid phase and liquid phase) was recovered from the reactor. This two-phase mixture was centrifuged and the solid phase was recovered in the form of a solid cake. A negligibly small fraction of the supernatant (liquid phase) was mixed with methanol anti-solvent to precipitate the soluble portion of the copolymer. The fraction of soluble copolymer was 15% (by wt.) of the entire copolymer produced. The mixture of supernatant (liquid phase) and methanol in 1:2 weight ratio was centrifuged and the soluble portion of the copolymer was recovered in the form of a solid cake. The intrinsic viscosity of the soluble portion of the copolymer was found to be 0.1 5 dl/g in a 74:15 weight/weight mixture of chloroform and chlorobenzene (25° C.) and the 2,3,6-trimethylphenol content was 39.6% by weight as analyzed by proton nuclear magnetic resonance (NMR) spectroscopy. The number average molecular weight was 3,650 atomic mass units and the weight average molecular weight was 10,600 atomic mass units as determined by gel permeation chromatography (GPC) using polystyrene standards.

The combined liquid and solid phases from the reaction were mixed with methanol anti-solvent in 1:2 weight ratio and the mixture was centrifuged. The entire copolymer (combined insoluble and soluble poly(arylene ether) resins) was recovered in the form of a solid cake. The intrinsic viscosity was 0.335 dl/g and the 2,3,6-trimethylphenol content was 49.4% by weight.

From the mass balance, the intrinsic viscosity of the insoluble poly(arylene ether) was calculated to be 0.368 dl/g, and the 2,3,6-trimethyphenol content of the insoluble poly(arylene ether) was calculated to be 51.13%.

EXAMPLE 2

This example describes a procedure for the determination of intrinsic viscosity of poly(arylene ether) copolymers that have low solubility in chloroform at 25° C. To a small glass vial is added 0.200±0.005 grams of poly(arylene ether) copolymer and 15.00 grams of chlorobenzene. The mixture is heated on a water bath to at least about 93° C. to form a clear solution. To another vial is added 74.16 grams of chloroform, which is heated to about 50° C. With extreme caution, chloroform is added to the poly(arylene ether)/chlorobenzene solution. This addition should be performed in a fume hood with the sash as low as possible because the temperature of the poly(arylene ether)/chlorobenzene solution is greater than the boiling point of chloroform, and the chloroform may boil vigorously. A lid is placed on the vial, which is then shaken gently. The lid is loosened to relieve pressure, then tightened again. The sample is allowed to cool to room temperature (approximately ½ hour), and the viscosity is determined using Ubbelohde capillary viscometer, comparing to a blank sample consisting of 15.00 grams of chlorobenzene and 74.16 grams of chloroform. The sample should appear clear when the viscosity is determined.

EXAMPLES 3–6

Following the general procedure of Example 1, five syntheses of DMP-TMP copolymer were conducted. The syntheses varied in the monomer charge (i.e., the weight percent of total monomer in the total reaction mixture), copper to phenol weight ratio, weight percent of TMP relative to the total of DMP and TMP. At the end of each reaction, the insoluble poly(arylene ether) was separated by centrifugation, and the soluble poly(arylene ether) was precipitated with methanol. Total copolymer was obtained by the precipitation of a representative sample of the reactor effluent (including both soluble and insoluble poly(arylene ether) resins) with methanol and separation of the resulting precipitate using the centrifuge. The insoluble copolymer was obtained by a direct centrifugation of the reactor effluent. The soluble copolymer was obtained by separating the soluble portion of the reactor effluent by centrifuge, then precipitating the poly(arylene ether) resin from that soluble portion by combining it with methanol to form a precipitate that was separated by the centrifuge. Amounts of soluble and insoluble poly(arylene ether) resins were expressed as a weight percentage of the total monomer, and their intrinsic viscosities ("IV") were measured at 25° C. in a 74:15 weight/weight mixture of chloroform and chlorobenzene. The weight fraction of 2,3,6-trimethyl-1,4-phenylene ether units in each copolymer was determined by proton NMR. Reaction conditions and product properties are summarized in Table 1. The results show that both the intrinsic viscosity and the 2,3,6-trimethyl-1,4-phenylene ether content of the insoluble copolymer are greater than those of the soluble copolymer. [t3]

TABLE 1

|  | Ex. 3 | Ex. 4 | Ex. 5 | Ex. 6 |
| --- | --- | --- | --- | --- |
| Reaction Conditions |  |  |  |  |
| monomer charge | 20 | 14 | 14 | 14 |
| [phenol]/[Cu] (w/w) | 900 | 900 | 450 | 300 |
| % TMP in monomer (wt %) | 45 | 47.5 | 50 | 50 |
| Product Properties |  |  |  |  |
| soluble copolymer as percentage of total monomer (%) | 8.7 | 15.9 | 17.8 | 10.3 |
| soluble copolymer concentration in solution (wt %) | 2.84 | 2.58 | 2.88 | 1.68 |
| IV of total copolymer (dL/g) | 0.32 | 0.32 | 0.32 | 0.43 |
| IV of soluble copolymer (dL/g) | 0.11 | 0.11 | 0.14 | 0.16 |
| IV of insoluble copolymer (dL/g) | 0.33 | 0.37 | 0.39 | 0.54 |

EXAMPLE 7

Using the reaction conditions of Example 6, a pilot plant run was conducted. The reaction was run for four hours, and the intrinsic viscosity and the glass transition temperature ($T_g$) of the total copolymer were determined at the end of reaction, after 5, 24, and 120 hours of equilibration, and after final drying. The intrinsic viscosities of the soluble and insoluble copolymers were characterized after 120 hours equilibration, as was the weight percentage of 2,3,6-trimethyl-1,4-phenylene ether units in the insoluble product. Results are presented in Table 2. These results further demonstrate that even in the absence of soluble copolymer recycling, the insoluble copolymer is enriched in TMP relative to the monomer feed, and the insoluble copolymer is depleted in TMP relative to the monomer feed. [t1]

TABLE 2

| | time | | | | |
|---|---|---|---|---|---|
| | end of reaction | 5 hours equil. | 24 hours equil. | 120 hours equil. | after drying |
| IV of total copolymer (dL/g) | 0.46 | 0.51 | 0.47 | 0.48 | 0.46 |
| IV of insoluble copolymer (dL/g) | — | — | — | 0.51 | — |
| IV of soluble copolymer (dL/g) | — | — | — | 0.17 | — |
| soluble copolymer as percentage of total monomer (%) | — | — | — | 11.3 | — |
| $T_g$ (° C.) | 232.3 | 231.2 | — | — | 230.8 |
| % TMP in soluble copolymer (%) | — | — | — | — | 35 |
| % TMP in insoluble copolymer (%) | — | — | — | — | 52 |

EXAMPLE 9

This example illustrates the synthesis and isolation of a poly(arylene ether) copolymer having 50 weight percent of repeating units derived from 2,3,6-trimethylphenol and 50 weight percent of units derived from 2,6-dimethylphenol in a reactor with recycling of soluble copolymer product. In a reactor are combined cuprous oxide ($Cu_2O$;0.014 kg) dissolved in hydrobromic acid (0.222 kg as 48% aqueous solution), N,N'-di-t-butylethylenediamine (0.062 kg, DBEDA), di-n-butylamine (0.212 kg, DRA), N,N-dimethylbutylamine (1.449 kg, DMBA), a tetraalkylammonium chloride surfactant (0.034 kg), 2,6-dimethylphenol (1.8 kg), toluene solvent (29 kg), and a recycle stream (116 kg recycled toluene and 2.83 kg of soluble copolymer with an intrinsic viscosity of about 0.15 dl/g in a 74:15 weight/weight mixture of chloroform and chlorobenzene (25° C.) and TMP content of 38%). Over the course of the polymerization reaction, additional 2,6-dimethylphenol (8.6 kg) is added, along with 2,3,6-trimethylphenol (10.4 kg). During the polymerization, the nitrogen flow rate is 61.3 liters/minute, the oxygen flow rate is 27.15 liters/minute, and the temperature is increased gradually from 29.4° C. to 55.0° C. After the completion of the polymerization reaction, a two-phase mixture (solid phase and liquid phase) is recovered from the reactor. This two-phase mixture is separated using solid-liquid centrifuge and the solid phase is recovered in the form of a solid cake. The effluent (liquid phase) contains the soluble portion of the copolymer dissolved in the toluene. The fraction of soluble copolymer is about 15% by weight of the entire copolymer produced. The effluent is recycled to the reactor and the solid cake is dried after washing with methanol anti-solvent. The intrinsic viscosity of the soluble portion of the copolymer is about 0.15 dl/g in a 74:15 weight/weight mixture of chloroform and chlorobenzene (25° C.) and the 2,3,6-trymethylphenol content is about 39% by weight. The 2,3,6-trimethyphenol content of the insoluble portion of the copolymer (dried powder) is about 50%, and the intrinsic viscosity is about 0.4 dl/g in a 74:15 weight/weight mixture of chloroform and chlorobenzene (25° C.).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A process for producing a poly(arylene ether), comprising:

oxidatively coupling a first monohydric phenol and a second monohydric phenol different from the first monohydric phenol in a reactor using an oxygen-containing gas in the presence of a solvent and a complex metal catalyst to produce a soluble poly(arylene ether) resin and an insoluble poly(arylene ether) resin; wherein the solvent consists essentially of a $C_6$–$C_{18}$ aromatic hydrocarbon; and wherein the soluble poly(arylene ether)'s molar ratio of phenylene ether units derived from the first monohydric phenol to phenylene ether units derived from the second monohydric phenol differs by at least about 0.05 from the insoluble poly(arylene ether)'s molar ratio of phenylene ether units derived from the first monohydric phenol to phenylene ether units derived from the second monohydric phenol;

separating the soluble poly(arylene ether) resin and the insoluble poly(arylene ether) resin; and recycling a portion of the soluble poly(arylene ether) resin to the reactor.

2. The process of claim 1, wherein the first monohydric phenol and the second monohydric phenol each independently have the formula

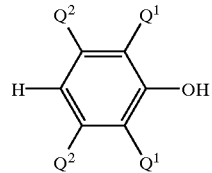

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

3. The process of claim 1, wherein the first monohydric phenol comprises 2,6-dimethylphenol, and the second monohydric phenol comprises 2,3,6-trimethylphenol.

4. The process of claim 3, wherein the weight ratio of the first monohydric phenol to the second monohydric phenol is about 1:99 to about 99:1.

5. The process of claim 1, wherein the complex metal catalyst comprises a metal ion from Group VIB, Group VIIB, or Group IB of the periodic table.

6. The process of claim 1, wherein the complex metal catalyst comprises chromium, manganese, cobalt, copper, or a combination comprising at least one of the foregoing metals.

7. The process of claim 1, wherein the complex metal catalyst comprises an alkylenediamine ligand having the formula $(R^b)_2N-R^a-N(R^b)_2$ wherein $R^a$ is a substituted or unsubstituted divalent residue wherein two or three aliphatic carbon atoms form the closest link between the two diamine nitrogen atoms; and each $R^b$ is independently hydrogen or C—C alkyl.

8. The process of claim 7, wherein each $R^a$ is ethylene or trimethylene, and each $R^b$ is independently hydrogen, isopropyl, or a $C_4$–$C_8$ alpha-tertiary alkyl group.

9. The process of claim 7, wherein the alkylenediamine ligand is N,N,N',N'-tetramethyl-1,3-diaminopropane.

10. The process of claim 7, wherein the alkylenediamine ligand is N,N'-di-t-butylethylenediamine.

11. The process of claim 1, wherein the complex metal catalyst comprises a $C_4$–$C_{12}$ secondary monoamine.

12. The process of claim 11, wherein the secondary monoamine comprises di-n-butylamine.

13. The process of claim 1, wherein the complex metal catalyst comprises a $C_4$–$C_{12}$ aminoalcohol, wherein at least two carbon atoms separate the amino nitrogen and the alcohol oxygen.

14. The process of claim 13, wherein the aminoalcohol is triethanolamine or N-phenyl-ethanolamine.

15. The process of claim 1, wherein the complex metal catalyst comprises an oxine having the formula:

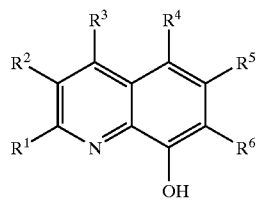

wherein $R^1$–$R^6$ are each independently selected from the group consisting of hydrogen, halogen, hydroxyl, nitro, amino, $C_1$–$C_6$ alkyl, and $C_1$–$C_6$ alkoxyl.

16. The process of claim 1, wherein the complex metal catalyst comprises a tertiary monoamine having the structure $(R^e)(R^f)(R^g)N$, wherein $R^e$ and $R^f$ and $R^g$ are each independently a $C_1$–$C_{16}$ alkyl group, with the proviso that $R^e$ and $R^f$ and $R^g$ collectively have a total of four to eighteen carbon atoms.

17. The process of claim 16, wherein the tertiary monoamine comprises dimethyl-n-butylamine.

18. The process of claim 1, wherein the complex metal catalyst comprises a $C_3$–$C_{13}$ primary alkylamine.

19. The process of claim 18, wherein the primary alkylamine is n-butylamine.

20. The process of claim 1, wherein the insoluble poly(arylene ether) resin has an intrinsic viscosity of at least about 0.2 dL/g as measured in a 74:15 weight/weight mixture of chloroform and chlorobenzene at 25° C.

21. The process of claim 1, wherein the soluble poly(arylene ether) resin and the insoluble poly(arylene ether) resin are each copolymers of 2,6-dimethylphenol and 2,3,6-trimethylphenol, and the mole fraction of 2,3,6-trimethyl-1,4-phenylene ether units in the soluble poly(arylene ether) resin is at least about 0.05 less than the mole fraction of 2,3,6-trimethyl-1,4-phenylene ether units in the insoluble poly(arylene ether) resin.

22. The process of claim 1, wherein separating the soluble poly(arylene ether) resin and the insoluble poly(arylene ether) resin comprises a technique selected from the group consisting of solid-liquid centrifugation, basket centrifugation, rotating filtration, continuous rotary vacuum filtration, continuous moving bed filtration, batch filtration, and combinations comprising at least one of the foregoing techniques.

23. The process of claim 1, wherein separating the soluble poly(arylene ether) resin and the insoluble poly(arylene ether) resin comprises solid-liquid centrifugation, basket centrifugation, or a combination thereof.

24. The process of claim 1, wherein recycling a portion of the soluble poly(arylene ether) resin comprises returning at least about 20 weight percent of the soluble poly(arylene ether) resin to the reactor.

25. The process of claim 1, wherein recycling a portion of the soluble poly(arylene ether) resin comprises recycling a portion of the solvent to the reactor.

26. The process of claim 1, further comprising recovering the complex metal catalyst with an aqueous solution.

27. The process of claim 1, wherein the process is a batch process, a semi-batch process, or a continuous process.

28. The process of claim 3, wherein the insoluble poly(arylene ether) comprises at least about 20 weight percent of 2,3,6-trimethyl-1,4-phenylene ether units.

29. The process of claim 3, wherein recycling a portion of the soluble poly(arylene ether) comprises maintaining the soluble poly(arylene ether) at a temperature T according to the expression $$T > \left( \frac{\phi_s - (0.296 \times IV + 1.27 \times TMP - 35.7)}{1.97(1 - 0.00795 \times IV - 0.0249 \times TMP)} \right)$$

where $\phi_s$ is the soluble poly(arylene ether) concentration in toluene, expressed in weight percent; IV is the intrinsic viscosity of the soluble poly(arylene ether) copolymer in a 74:15 weight/weight mixture of chloroform and chlorobenzene at 25° C., expressed in mL/g; and TMP is the content of 2,3,6-trimethyl-1,4-phenylene ether units in the soluble poly(arylene ether) copolymer, expressed in weight %, based on the total weight of the soluble poly(arylene ether) copolymer.

30. The process of claim 3, wherein the concentration of the soluble poly(arylene ether) in the recycled portion is given by $\phi_s$ according to the expression $\phi_s \leq (0.30)IV + (1.27)TMP - (35.7) + (1.97)T_{cloud}(1 - (1 - (0.0080)IV - (0.0249)*TMP)$ where $\phi_s$ is expressed in weight percent, IV is the soluble poly(arylene ether) copolymer intrinsic viscosity in a 74:15 weight/weight mixture of chloroform and chlorobenzene at 25° C. (expressed in mL/g), TMP is weight percent of 2,3,6-trimethyl-1,4-phenylene ether units in the soluble poly(arylene ether) copolymer (expressed in weight percent), and T is the temperature of the recycled portion (expressed in °C.).

31. A process for producing a poly(arylene ether), comprising:
   oxidatively coupling a monohydric phenol in a reactor using an oxygen-containing gas in the presence of a solvent and a complex metal catalyst to produce a soluble poly(arylene ether) resin and an insoluble poly(arylene ether) resin; wherein the solvent consists of a $C_6$–$C_{18}$ aromatic hydrocarbon;
   separating the soluble poly(arylene ether) resin and the insoluble poly(arylene ether) resin; and
   recycling a portion of the soluble poly(arylene ether) resin to the reactor.

32. The process of claim 31, wherein the monohydric phenol has the formula

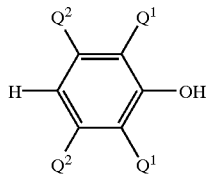

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

33. The process of claim 31, wherein the monohydric phenol comprises a first monohydric phenol and a second monohydric phenol, wherein the first monohydric phenol and the second monohydric phenol are different and each has the formula

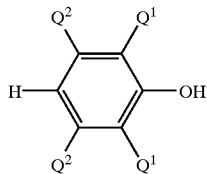

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

34. The process of claim 31, wherein the monohydric phenol comprises 2,6-dimethylphenol, 2,3,6-trimethylphenol, or a combination thereof.

35. A process for producing a poly(arylene ether), comprising:

oxidatively coupling a first monohydric phenol and a second monohydric phenol different from the first monohydric phenol in a reactor using an oxygen-containing gas in the presence of a solvent and a complex metal catalyst to produce a soluble poly(arylene ether) resin and an insoluble poly(arylene ether) resin; wherein the solvent consists of a $C_6$–$C_{18}$ aromatic hydrocarbon; and wherein the soluble poly(arylene ether)'s molar ratio of phenylene ether units derived from the first monohydric phenol to phenylene ether units derived from the second monohydric phenol differs by at least about 0.05 from the insoluble poly(arylene ether)'s molar ratio of phenylene ether units derived from the first monohydric phenol to phenylene ether units derived from the second monohydric phenol;

separating the soluble poly(arylene ether) resin and the insoluble poly(arylene ether) resin; and recycling a portion of the soluble poly(arylene ether) resin to the reactor.

* * * * *